United States Patent
Silverstein et al.

(10) Patent No.: US 10,832,484 B1
(45) Date of Patent: Nov. 10, 2020

(54) VIRTUAL REALITY RISK DETECTION

(71) Applicant: International Business Machines Corporation, Armonk, NY (US)

(72) Inventors: Zachary A. Silverstein, Austin, TX (US); Trudy L. Hewitt, Cary, NC (US); Jeremy R. Fox, Georgetown, TX (US); Robert Huntington Grant, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/407,875

(22) Filed: May 9, 2019

(51) Int. Cl.
| | |
|---|---|
| *G06T 19/00* | (2011.01) |
| *G06Q 10/06* | (2012.01) |
| *G06F 3/048* | (2013.01) |
| *G06F 3/01* | (2006.01) |

(52) U.S. Cl.
CPC ............ *G06T 19/006* (2013.01); *G06F 3/011* (2013.01); *G06F 3/048* (2013.01); *G06Q 10/0635* (2013.01)

(58) Field of Classification Search
CPC ........ G06T 19/006; G06F 3/011; G06F 3/048; G06Q 10/0635
USPC .......................................................... 345/633
See application file for complete search history.

(56) References Cited

U.S. PATENT DOCUMENTS

| | | | |
|---|---|---|---|
| 9,990,778 B2 | 6/2018 | Long | |
| 2003/0210228 A1* | 11/2003 | Ebersole | G02B 27/017 345/157 |
| 2011/0298824 A1* | 12/2011 | Lee | A63F 13/31 345/633 |
| 2012/0194549 A1* | 8/2012 | Osterhout | G02B 27/0093 345/633 |
| 2013/0293586 A1* | 11/2013 | Kaino | G06F 3/005 345/633 |
| 2014/0168266 A1* | 6/2014 | Kimura | G02B 27/0172 345/633 |
| 2015/0161867 A1* | 6/2015 | Bell | G08B 21/02 340/539.13 |

(Continued)

FOREIGN PATENT DOCUMENTS

| | | |
|---|---|---|
| WO | 2003060830 A1 | 7/2003 |
| WO | 2018200315 A1 | 11/2018 |

OTHER PUBLICATIONS

Lebeck et al., "How to Safely Augment Reality: Challenges and Directions," https://homes.cs.washington.edu/~kklebeck/hotmobile16.pdf, Hot Mobile '16, Feb. 23-24-2016, © 2016 ACM, 6 pgs.

(Continued)

*Primary Examiner* — Ke Xiao
*Assistant Examiner* — Kim Thanh T Tran
(74) *Attorney, Agent, or Firm* — Peter K. Suchecki

(57) ABSTRACT

Provided is a method, computer program product, and virtual reality system for applying an individualized risk tolerance threshold to external risks during a virtual reality simulation. A processor may receive event data from one or more devices communicatively coupled to a virtual reality device. The processor may compare the event data to a risk tolerance threshold specifically generated for a first user. In response to the risk tolerance threshold being met, the processor may push a notification to the virtual reality device indicating a potential risk to the first user has been determined.

17 Claims, 7 Drawing Sheets

(56) References Cited

U.S. PATENT DOCUMENTS

2016/0140868 A1* 5/2016 Lovett ............... G09B 19/0053
 434/118
2018/0232056 A1 8/2018 Nigam et al.
2019/0041973 A1 2/2019 Maheshwari et al.

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.
Metz, R., "How to Avoid Real Objects While in a Virtual World," https://www.technologyreview.com/s/538336/how-to-avoid-real-objects-while-in-a-virtual-world/, Jun. 12, 2015, printed Mar. 1, 2019, 6 pgs.
Occipital, "The Spatial Computing Company," https://occipital.com/, printed Mar. 1, 2019, 5 pgs.

* cited by examiner

VIRTUAL REALITY RISK DETECTION

BACKGROUND

The present disclosure relates generally to the field of virtual reality (VR), and more specifically, to applying an individualized risk tolerance threshold to external risks during a VR simulation.

As VR becomes more prevalent, users may be subjected to unseen external risks when immersed in a VR simulation. For example, various obstructions such as sharp objects, pets, and/or other people may come into a user's active area while engaging in the VR simulation. These obstructions may present injury risks unknown to the user when interacting within the VR simulation.

SUMMARY

Embodiments of the present disclosure include a method, computer program product, and virtual reality system for applying an individualized risk tolerance threshold to external risks during a virtual reality simulation. A processor may receive event data from one or more devices communicatively coupled to a virtual reality device. The processor may compare the event data to a risk tolerance threshold specifically generated for a first user. In response to the risk tolerance threshold being met, the processor may push a notification to the virtual reality device indicating a potential risk to the first user has been detected.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
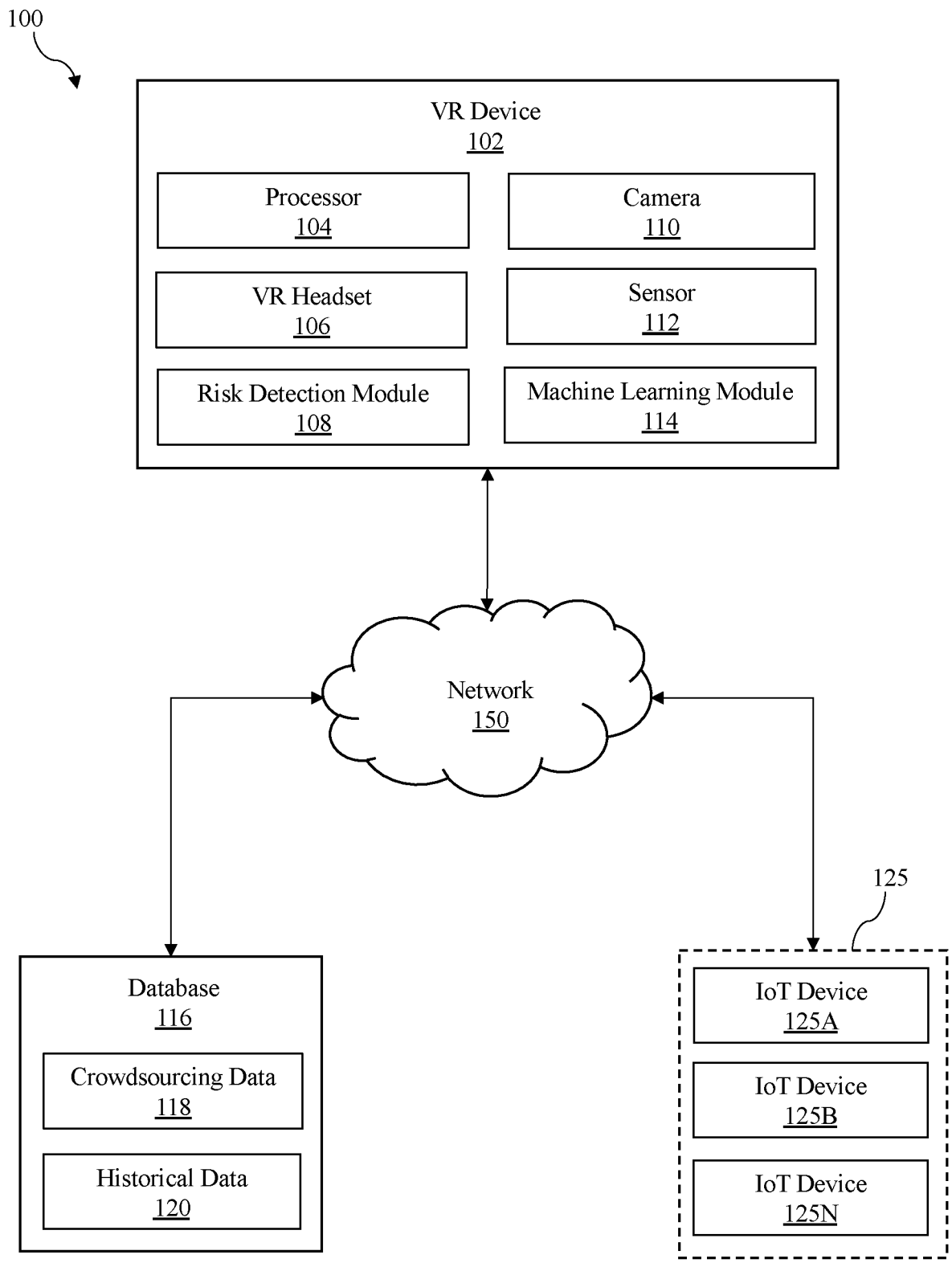
FIG. 1 illustrates a block diagram of a virtual reality system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of virtual reality (VR), and more particularly to applying an individualized risk tolerance threshold to external risks during a VR simulation. While the present disclosure is not necessarily limited to such applications, various aspects of the disclosure may be appreciated through a discussion of various examples using this context.

As VR becomes more prevalent, users can be subjected to unseen risks when immersed in a VR simulation. For example, when wearing a VR headset, various hazards may be blocked from view of the user. Hazards such as sharp objects, pets, and/or other people may come into a user's active area while immersed in the VR simulation. These obstructions may present injury risks to the user when interacting with the VR simulation. In order to prevent injury to the user or others, the user's external environment must be monitored for potential risks. However, depending on the risk tolerance of the user, certain objects and/or events occurring externally to the VR simulation may not be considered risks to that specific user.

For example, a first user may typically move about a room within an active area of 25 square feet when participating in a VR simulation. In such a scenario, the first user may prefer to be alerted to risks (e.g., potential tripping hazards, sharp objects, etc.) occurring within this active area. However, a second user may only move around slightly during the VR simulation and prefer an active area of 9 square feet to be monitored for risk. The second user may consider alerts to potential risks falling outside of their typical active area an inconvenience because the alerts disrupt their VR experience.

In another example, a first user may consider a child climbing on a piece of furniture (e.g., wobbly bookshelf, coffee table, etc.) to be a potential risk because the child might sustain an injury. Therefore, the first user would prefer to be alerted of such a risk when immersed in the VR simulation. However, a second user may not consider a child climbing on furniture a risk because their furniture is sturdy (e.g., bookshelf secured to the wall) and/or the child is old enough to climb safely. Therefore, the second user may not want their VR simulation interrupted by an alert for such a potential risk.

Embodiments of the present disclosure identify an external risk relative to a user immersed in a VR simulation by applying an individualized risk tolerance threshold to the detected risk. If the external risk meets the risk tolerance threshold for the specific user, a notification is sent to the user alerting the user of the risk. In this way, a user may be alerted to potential risks based on the user's own individualized risk tolerance.

In embodiments, the system (e.g., VR device and/or VR headset) may receive event data from one or more communicatively coupled devices. The communicatively coupled devices may be any type of device that can generate event data (e.g., image data, audio data, biometric data, location/proximity data, etc.). For example, the device may be an outwardly facing camera disposed on a VR headset that generates image data used for image recognition analysis. In other embodiments, the communicatively coupled device may be an internet of things (IoT) device (e.g., IoT camera, IoT sensor, IoT smart speaker, microphone, etc.).

In embodiments, the system compares the received event data to a risk tolerance threshold for a first user. The risk tolerance threshold may be an individualized threshold generated specifically for a respective user based on analysis of historical risk tolerance data. If the risk tolerance threshold is met, the system may push a notification to the VR device (e.g., user interface (UI) on a VR headset) indicating a potential risk to the first user has been detected.

For example, through image recognition analysis of the event data from an IoT camera, the system may determine there is a thumbtack within a user's active area. If the event data meets a risk tolerance threshold (e.g., the thumbtack is within the active area based on proximity and weighted alerts), the system sends a notification to the user's VR headset. The system may continually query the external environment for event data indicative of risk while the user is immersed within a VR simulation.

In embodiments, the notification may be any type of notification (e.g., image, video, audio, text). For example, the notification may be in the form of a live video feed of the potential risk displayed on the UI of the VR headset. In other embodiments, the notification may be an audio alert that warns the user there is a potential risk nearby. In another embodiment, the notification may be in the form of an indicator (e.g., warning light) displayed on the UI.

For example, an indicator may appear on the UI in the direction of a detected object warning the user of the potential risk. In this way, the user may be notified where the object is in relation to the user, such that the user may avoid that risk while maintaining immersion within the VR simulation. In embodiments, the indicator may include different warning levels (e.g., red, yellow, etc.) to notify the user that they are within a certain distance of an object. For example, yellow may indicate an object is within 4 feet, while red may indicate an object is within 2 feet of the user. In another embodiment, the indicator may be in the form of the object that is detected nearby. For example, a small outline of a dog may appear on the UI indicating a dog is nearby.

In embodiments, the risk tolerance threshold may be generated for a user by analyzing historical risk tolerance data associated with the specific user. The historical risk tolerance data may be indicative of actions taken by the first user in response to historical event data. For example, the system may analyze historical interactions collected from IoT devices throughout an environment to determine a user's tolerance to certain risks. For example, audio and visual data generated from an event where the user tells a child not to climb on an object may be gathered by the system through an IoT camera and IoT microphone. This data may be analyzed by machine learning to determine that the user considers a child climbing on an object a risk.

In another example, the system may analyze biometric data (e.g., elevated heart rate data) from an IoT device (e.g., smartwatch) in conjunction with image data from an IoT camera showing a user hitting their leg on a coffee table when playing a VR game. The system may analyze the biometric and image data using machine learning and generate a risk tolerance threshold for altering a user when a coffee table is in proximity to the user at a certain distance. The risk tolerance threshold may vary user to user based on various aspects of the user's profile (e.g., height, stride length, wingspan, movement patterns, etc.). For example, the risk tolerance threshold for identifying objects as risks within an active area at distance relative to the user may increase or decrease dependent on the length of the user's stride.

In embodiments, multiple risk tolerance thresholds may be generated depending on the type of risks and where the risks are detected. For example, risk tolerance thresholds may be generated for risks that may cause a tripping hazard within the user's active area. In addition, risk tolerance thresholds may be generated for risks that may be occurring outside the user's active area (e.g., within another room, outside of the house, etc.).

For example, a linked IoT camera in another room may generate image data showing a pet eating a hazardous chemical. Through historical risk tolerance data and image recognition analysis (e.g., image/audio data of the user stopping the pet from eating the hazardous chemical on previous occasions), the system may determine that the pet eating the hazardous chemical in another room is a high risk and the user will be alerted. In this way, even though the pet is not posing a tripping hazard to the user interacting with the VR simulation, the system will still notify the user of the determined risk.

In embodiments, crowdsourced data may be used to generate and/or adjust risk tolerance thresholds for the user. The system may receive crowdsourced risk tolerance data for a plurality of users from a plurality of IoT devices. The crowdsourced risk tolerance data may be correlated with the user's individualized risk tolerance data to determine if there are similar patterns of risk tolerance. If a pattern is detected, additional risks may be predicted and identified within the user's predicted preference. In this way, risk tolerance thresholds may be adjusted and/or new thresholds may be generated from the correlation of the crowdsourced data and the user's data.

While VR may be used as the primary example herein, this is not limiting on the implementation of the system. Embodiments of the present disclosure may be applied to augmented reality (AR), mixed reality (MR), augmented virtuality (AV), and other forms of real-and-virtual combined environments and human-machine interactions generated by computer technology and wearables.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of a virtual reality (VR) system 100, in accordance with embodiments of the present disclosure. In the illustrated embodiment, VR system 100 includes a virtual reality (VR) device 102, database 116, Internet of Things (IoT) device 125A, IoT device 125B, and IoT device 125N (collectively referred to as IoT device(s) 125) that are communicatively coupled via network 150. The network 150 may be any type of communication network, such as a wireless network or a cloud computing network.

Figure 7:
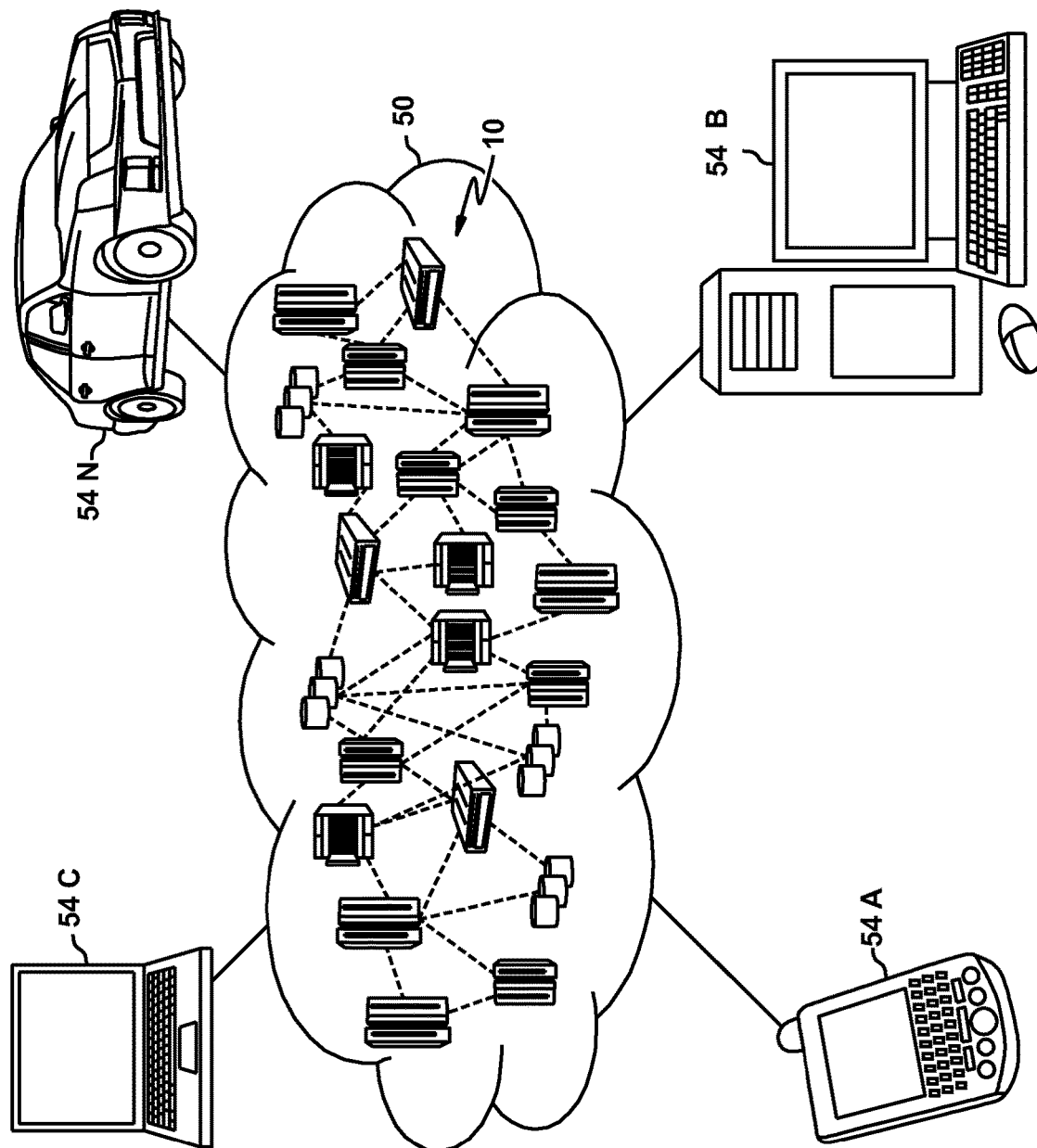
FIG. 7 depicts a cloud computing environment according to an embodiment of the present invention.
Figure 8:
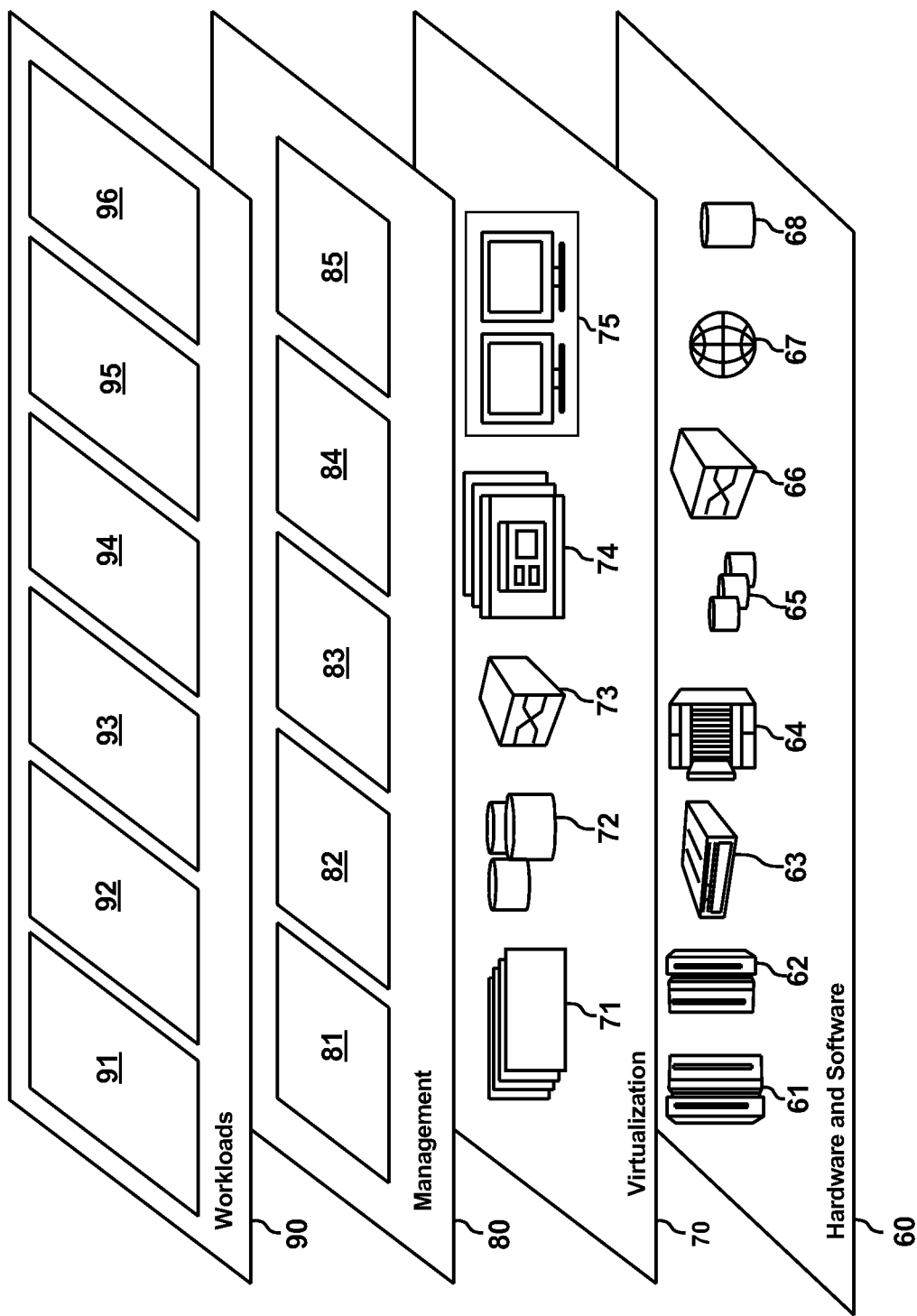
FIG. 8 depicts abstraction model layers according to an embodiment of the present invention.

The network 150 may be substantially similar to, or the same as, cloud computing environment 50 described in FIG. 7 and FIG. 8. In some embodiments, the network 150 can be implemented using any number of any suitable communications media. For example, the network may be a wide area network (WAN), a local area network (LAN), a personal area network (PAN) used for exchanging data over short distances, an internet, or an intranet. In certain embodiments, the various systems may be local to each other, and communicate via any appropriate local communication medium. For example, VR device 102 may communicate with database 116 and/or IoT devices 125 using a WAN, one or more hardwire connections (e.g., an Ethernet cable) and/or wireless communication networks (e.g., wireless router, personal area network). In some embodiments, the various systems may be communicatively coupled using a combination of one or more networks and/or one or more local connections. For example, VR device 102 may communicate with database 116 using a hardwired connection, while communication between the VR device 102 and the IoT devices 125 may be through a wireless communication network (e.g., PAN).

IoT device 125 may be any type of device that generates event data (e.g., image data, biometric data, audio data, etc.). For example, IoT device 125A may be a smartwatch that generates biometric data and motion data, IoT device 125B may be a smart speaker that analyzes speech through natural language processing to generate textual data, and IoT device 125N may be a camera that utilizes motion detection to generate image data.

Figure 6:
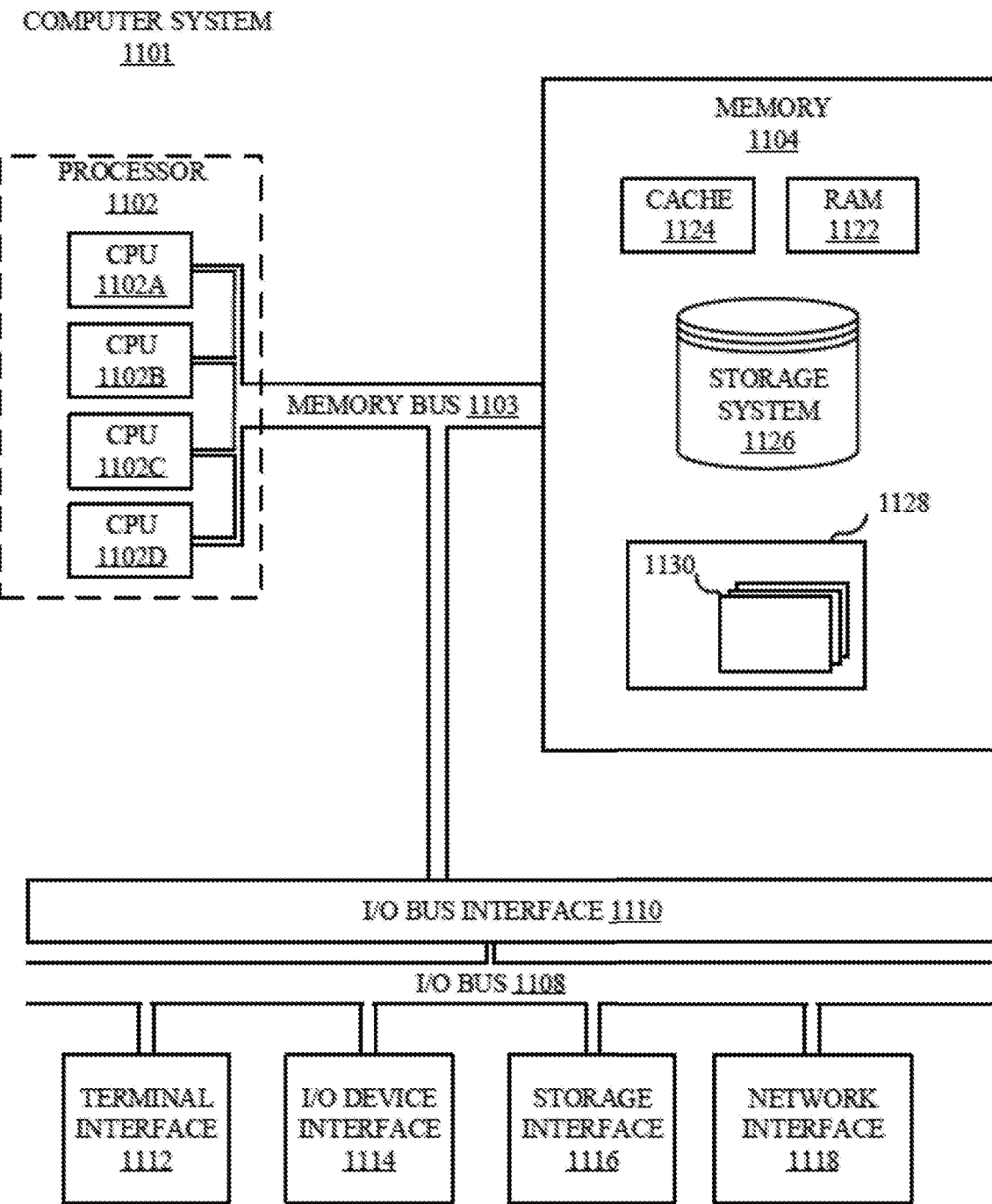
FIG. 6 illustrates a high-level block diagram of an example computer system that may be used in implementing one or more of the methods, tools, and modules, and any related functions, described herein, in accordance with embodiments of the present disclosure.

In embodiments, IoT devices 125 and VR device 102 may be any type of computer system and may be substantially similar to computer system 1101 of FIG. 6.

In the illustrated embodiment, VR device 102 includes VR headset 106 which is configured to output a virtual reality simulation to a user. In some embodiments, VR headset 106 may be configured as VR device 102, wherein VR headset 106 contains all the components shown in VR device 102. In some embodiments, VR system 100 may only include the VR device 102. For example, VR device 102 may be a stand-alone system that is not connected to another device (e.g., database 116, IoT devices 125) through a network.

In the illustrated embodiment, VR device 102 includes processor 104, camera 110, and sensor 112. Camera 110 may generate image data (e.g., event data) that is analyzed by VR device 102 to determine external risks to the user. For example, camera 110 may generate image data of a tripping hazard (e.g., furniture, pet, person, etc.) that is determined to be a risk through image recognition analysis.

Sensor 112 may be any type of sensor configured to detect various forms of event data. Types of sensors may include audio sensors, BLE sensors, accelerometers, gyroscopes, geomagnetic sensors, magnetic sensors, proximity sensors, gesture sensors, grip sensors, biometric sensors, audio modules, atmospheric pressure sensors, RGB sensors, temperature sensors, humidity sensors, light sensors, physiological sensors, location/position detection sensors, and UV sensors. For example, sensor 112 may be a motion detection sensor configured to detect movement of an object (e.g., a person moving within the external environment).

In embodiments, camera 110 and sensor 112 may be categorized as IoT devices similar to IoT devices 125. In some embodiments, VR headset 106 may include camera 110 and/or sensor 112. In some embodiments, the VR device 102 may not include either camera 110 or sensor 112. In some embodiments, IoT devices 125 may include one or more cameras 110 and/or one or more sensors 112.

In the illustrated embodiment, the VR device 102 includes risk detection module 108 configured to analyze event data (e.g., image data, biometric data, audio data). For example, risk detection module 108 may receive event data from various components within VR system 100 and analyze this event data for risks. Event data may be produced in various forms from various sources (e.g., camera 110, sensor 112, IoT devices 125).

For example, event data generated form BLE sensors or IoT devices 125 equipped with cameras may be sent to the risk detection module 108 to be analyzed. This event data may be analyzed by determining if the data generated meets a risk tolerance threshold. If the threshold is met, the risk detection module 108 may notify the user of the potential risk.

In embodiments, the user may be notified of potential risks in various ways. For example, the risk detection module 108 may push/send a text notification that appears on the user interface (UI) of VR headset 106. In other embodiments, the notification may be in the form of an image or current video feed of the potential risk received from a linked IoT device 125. In another embodiment, the system may send an audio alert to the VR headset 106.

In the illustrated embodiment, VR device 102 includes machine learning module 114. Machine learning module 114 may comprise various machine learning engines (artificial neural network, correlation engines, natural language processing engine, reinforcement feedback learning model, supervised learning model, etc.) to analyze event data generated from various sources (e.g., linked camera, IoT devices, etc.). In embodiments, machine learning module 114 may analyze historical data 120 and/or crowdsourcing data 118 located on database 116. Historical data may be any type of data generated by the system (e.g., historical risk tolerance data, historical event data, etc.).

For example, machine learning module 114 may include one or more artificial neural networks configured to learn from various historical risk tolerance data received by VR device 102. For example, the VR device 102 may use machine learning module 114 to analyze historical risk tolerance data for accuracy for predicting potential risks for a specific user. The machine learning module 114 may correlate historical risk tolerance data for a specific user with crowdsourced risk tolerance data to determine patterns for predicting risks. Once predictions are made based on correlating the data, the risk tolerance thresholds may be improved to more accurately predict risks according to a user's preferences. As more data is learned by the system 100, the weights of the neural network can be adjusted, automatically, by processor 104. Over time, the system 100 can become more accurate in determining what type of risks require an alert notification to be sent to the user when interacting with the VR simulation.

In embodiments, historical data 120 and/or crowdsourcing data 118 may be received and/or stored on database 116. In some embodiments, historical data 120 and/or crowdsourcing data 118 may be stored on VR device 102. In embodiments, database 116 may be any type of computer system and may be substantially similar to computer system 1101 of FIG. 6. In some embodiments, database 116 may be a cloud database. In some embodiments, database 116 may include machine learning module 114. In the illustrated embodiment, the risk detection module 108 is disposed within the VR device 102 to prevent any latency issues when analyzing external risks. However, in another embodiment, the risk detection module 108 may be included in database 116.

It is noted that FIG. 1 is intended to depict the representative major components of the virtual reality system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the VR system 100 may not be present, and the arrangement of components may vary.

For example, while FIG. 1 illustrates an example VR system 100 having a single VR device 102 and one database 116, and three IoT devices 125, suitable network architectures for implementing embodiments of this disclosure may include any number of VR devices, databases, and IoT devices. The various models, modules, systems, and components illustrated in FIG. 1 may exist, if at all, across a plurality of VR devices, databases, and IoT devices.

Figure 2:
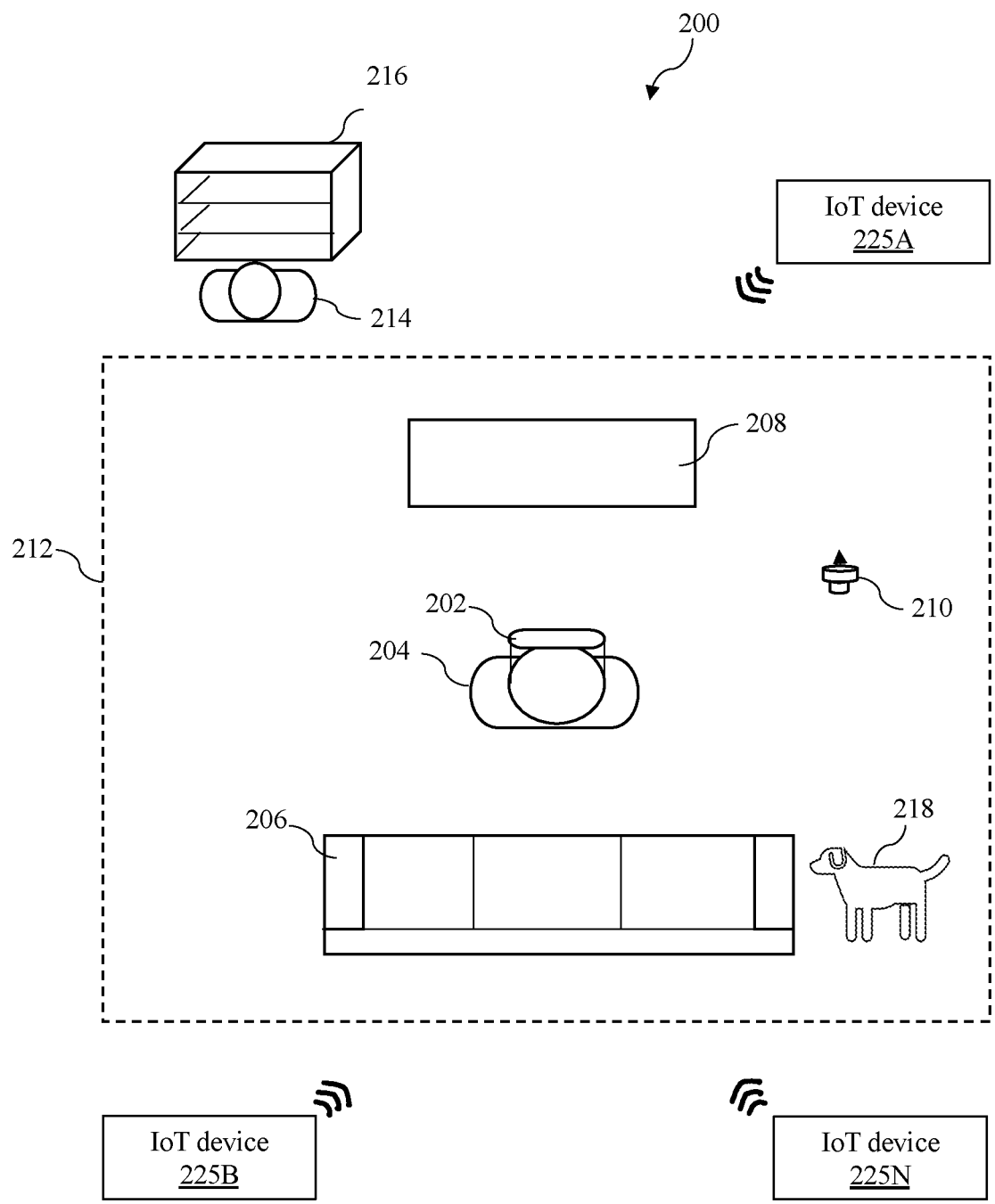
FIG. 2 illustrates an overhead view of an example external environment for a user participating in a virtual reality simulation, in accordance with embodiments of the present disclosure.

Referring now to FIG. 2, shown is an overhead view of an example external environment 200 for a user 204 participating in a VR simulation, in accordance with embodiments of the present disclosure. In the illustrated embodiment, the user 204 is wearing VR device 202. When worn, the VR device 202 (e.g., VR headset) obstructs the user's 204 view of various risks/objects throughout the external environment 200. For example, multiple objects that are near the user may be considered potential risks, such as couch 206, table 208, and thumbtack 210. These risks are shown within the active area 212 of the user 204. The active area 212 is the area surrounding user 204 where the user may move about when interacting with a VR simulation. For example, the active area 212 may comprises an area that is 20 square feet, depending on the user's actions. In embodiments, the active area 212 may be determined from historical event data indicative of the user's actions (e.g., movements within an environment) when immersed in a VR simulation. For example, historical data for a VR baseball game and a VR basketball game may have different active areas based on the movement of the user during the games.

The external environment 200 includes IoT device 225A, 225B, and 225N (collectively referred to as IoT devices 225). These IoT devices 225 collect event data (e.g., image data, sound data, motion data) and send the event data to the VR device 202. In embodiments, the VR device 202 may include one or more communicatively coupled cameras and/or sensors that generate event data to be analyzed by VR device 202. The event data is analyzed for risk recognition according to a risk tolerance threshold that is specific for the user 204. If the risk tolerance threshold is met, user 204 is notified of the potential risk.

For example, IoT device 225A may be an IoT camera that captures image data of thumbtack 210. This image data may be sent to VR device 202 where it is analyzed for risk through image recognition analysis. Based on previous risk tolerance data generated for the user, the system may determine the thumbtack 210 is a potential injury risk because it is detected within the action area 212 relative to the user 204. Therefore, an alert notification will be sent to the user 204 via a user interface on the VR device 202 warning the user of the thumbtack 210.

However, in another example, a second user may always wear shoes when playing a VR game. The system may analyze this event data (e.g., image recognition of the second user wearing shoes), such that no alert is sent to the user because the thumbtack 210 does not pose an injury risk. In this way, the system does not interrupt the second user's VR experience by sending them an unnecessary alert.

In another example, the system may determine that user 204 kicks their legs forward when immersed in VR simulation based on historical event data. For example, while playing a virtual soccer game, the system may determine that the user kicks and moves forward 18 inches on average during the simulation. The system may analyze this event data and generate a risk tolerance threshold to alert user 204 when they are within 18 inches of table 208. However, for a second user, the system may determine that the second user moves an average of 28 inches forward during the VR simulation. Therefore, the system would adjust the risk tolerance threshold to alert the second user when they are within 28 inches of a table.

In embodiments, the IoT devices 225 may detect risks that occur outside of the active area 212. For example, IoT device 225B (e.g., IoT camera/motion sensor, etc.) may detect child 214 climbing on bookshelf 216 through image recognition. Although this event is not occurring inside the active area 212 relative to the user 204, the system may determine the event is a risk based on previous risk tolerance data associated with the user 204.

For example, historical risk tolerance data may indicate that user 204 does not allow their child 214 to climb on bookshelf 216. This data may be analyzed to generate a risk tolerance threshold that alerts the user if event data received indicates child 214 is climbing on bookshelf 216. However, a second user may allow their older children to climb on the bookshelf because the bookshelf is secured to the wall and the children have been known to climb safely. Therefore, the system may adjust the threshold for the second user, such that no alert is sent.

In another example, a dog 218 sitting in the active area 212 may not be determined to be a risk because it is located behind the user 204 at a certain distance and not moving. However, based on historical risk tolerance data, if the dog 218 is determined to be moving and/or chewing on the couch 206, the system may alert the user of the risk. In this way, various event data generated from the IoT devices 225 (and/or cameras or sensors disposed on the VR device 202 itself) may be used to alert the user 204 to potential risks according the user's personalized risk tolerances.

Figure 3:
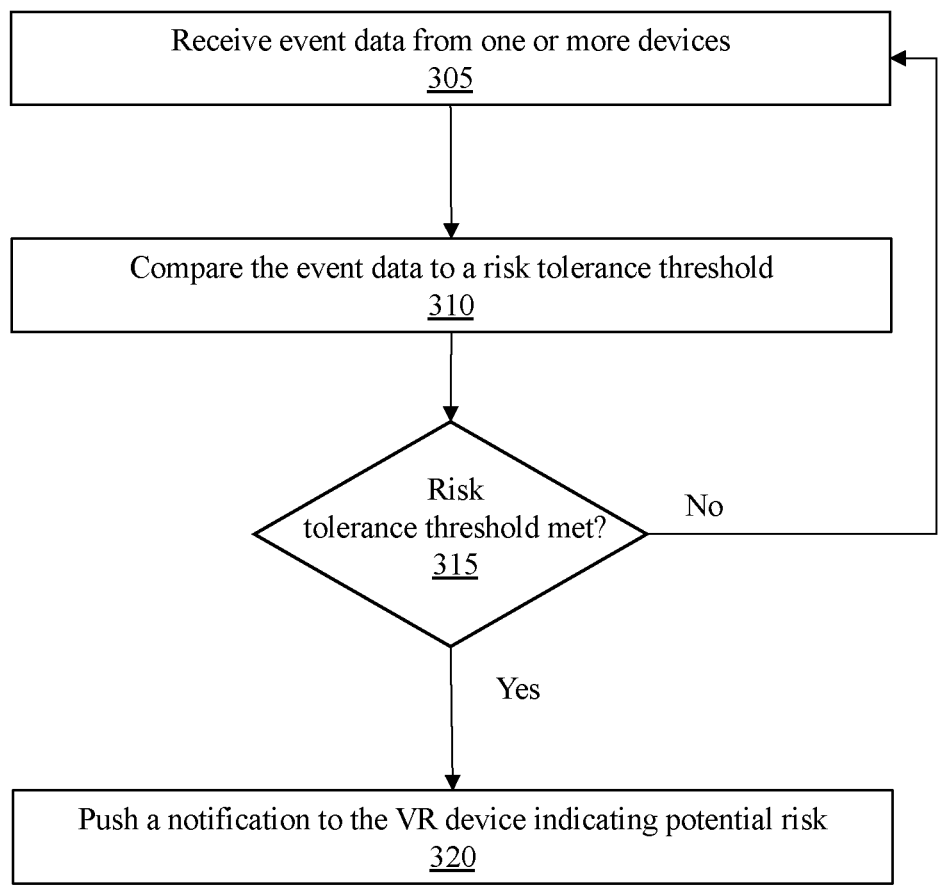
FIG. 3 illustrates a flow diagram of an example process for determining potential risks, in accordance with embodiments of the present disclosure.

Referring now to FIG. 3, shown is a flow diagram of an example process 300 for determining potential risks, in accordance with embodiments of the present disclosure. The process 300 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 300 is a computer-implemented process. The process 300 may be performed by processor 104 exemplified in FIG. 1.

The process 300 begins by receiving event data from one or more devices communicatively coupled to a VR device. This is illustrated at step 305. In embodiments, the event data may be image data received from an externally facing camera disposed on the VR device (e.g., VR headset). In other embodiments, the event data may be received from one or more IoT devices. The event data may be generated and sent to the VR device in various formats (e.g., image data, audio data, motion sensor data, proximity data, location data, etc.) depending on the IoT device. In embodiments, the event data may include data regarding the type and location of an object relative to a user immersed within a VR simulation. For example, the event data may indicate a child is playing in an area in close proximity to the user.

The process 300 continues by comparing the event data to a risk tolerance threshold for a first user. This is illustrated at step 310. For example, a risk tolerance threshold may be set to alert the user when an object is within a predetermined distance to the user. For example, the risk tolerance threshold may be set to alert the user when a child is playing within 5 ft of the user during the VR simulation. Based on the event data received from the communicatively coupled camera and/or the IoT devices, the VR system will determine if the event data meets the risk tolerance threshold such that a user would prefer to be warned of the risk.

If the risk tolerance threshold has not been met, "no" at step 315, then the process returns to step 305 where the processor continues to receive event data from the communicatively coupled camera and/or the IoT devices. For example, a child playing a distance of 10 ft away from the user would not meet a 5 ft threshold, therefore the system would continue to query received event data (e.g., return to step 305).

If the risk tolerance threshold has been met, "yes" at step 315, the process continues by pushing a notification to the VR device indicating a potential risk to the first user has been detected. This is illustrated at step 320. For example, if a child is within 4 ft of the user, the distance 5 ft threshold would be met, and the system would alert the user of the presence of the child.

In embodiments, the notification may be any type of notification. For example, the notification may comprise displaying a text message referring to the potential risk, displaying an image of the potential risk, displaying a live video feed of the potential risk and/or providing an audio alert regarding the potential risk. For example, if the event data (e.g., image data showing a child within the user's active area) meets the risk tolerance threshold, an image of the child may be pushed to the UI of the VR headset to warn the user of the potential risk. In another embodiment, the notification may be based on the type of risk (e.g., low risk, medium risk, high risk). For example, a user may be warned via an indicator (e.g., small flashing light on UI) that the user is about to bump into an object (e.g., low risk). In another example, the VR simulation may display a live feed of a pet eating a hazardous material (e.g., high risk) on the UI. In another embodiment, the system may automatically pause the VR simulation based on the risk level (e.g., potential serious injury).

In embodiments, various risks may not meet the risk tolerance threshold depending on their proximity to the user interacting with the VR device. In embodiments, certain risks may only meet the threshold if they are detected to be within an action area relative to the user. The action area may be defined by a distance relative to the user. For example, a thumbtack that has been detected (e.g., through image data from an IoT camera) in another room within the house of the user may not meet the threshold because it is not within the user's active area. The active area may be determined by the system based on historical event data. For example, the user may only worry about objects and/or risks that are within 10 ft of the user wearing the VR headset. However, another user may prefer to be warned of risks that are with 8 ft of the user. In this way, the risk tolerance thresholds may vary user to user.

Figure 4:
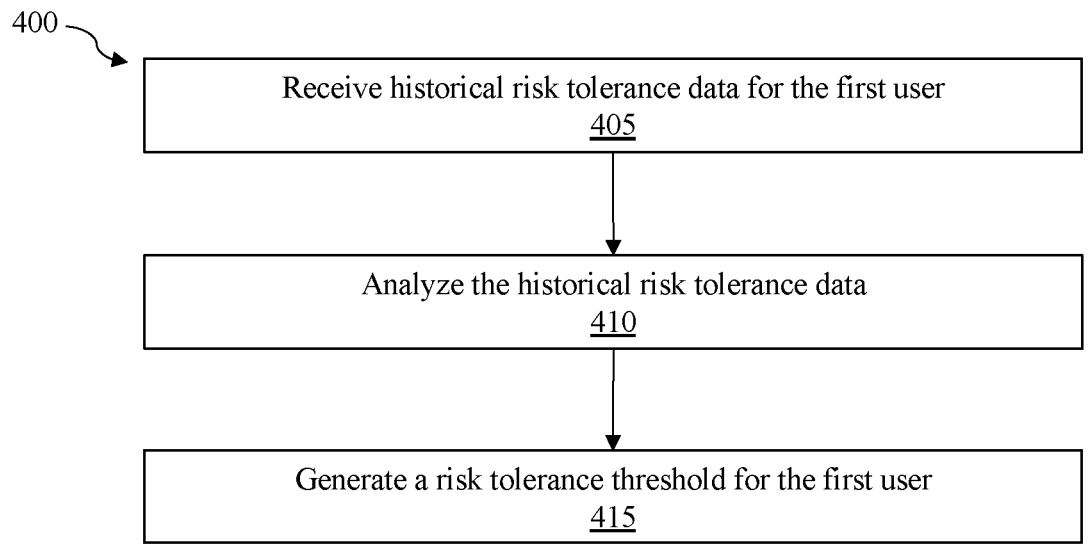
FIG. 4 illustrates a flow diagram of an example process for generating a risk tolerance threshold for a user, in accordance with embodiments of the present disclosure.

Referring now to FIG. 4, shown is a flow diagram of an example process 400 for generating a risk tolerance threshold for a user, in accordance with embodiments of the present disclosure. In embodiments, the process 400 may be in addition to or a subset of process 300 detail in FIG. 3. The process 400 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 400 is a computer-implemented process. The process 400 may be performed by processor 104 exemplified in FIG. 1.

The process 400 begins by receiving historical risk tolerance data for a first user. This is illustrated at step 405. In embodiments, the historical risk tolerance may be received from a database (e.g., cloud database), and/or one or more IoT devices. In embodiments, the historical risk tolerance data may be stored locally on the VR device. The historical risk tolerance data comprises data indicative of actions taken by the first user in response to historical event data.

For example, the historical risk tolerance data may comprise various image data, biometric data, and audio data regarding actions of the user when responding to event data. For example, the event data may include images of the user stepping on a thumbtack, biometric data of elevated heart rate of the user when stepping on the thumbtack, and audio of the user screaming in pain in response to stepping on the thumbtack. This historical risk tolerance data may be analyzed in combination to determine that a thumbtack may be classified as a potential risk to the user.

The process 400 continues by analyzing, using machine learning, the historical risk tolerance data. For example, the system may analyze various data generated from the IoT devices to determine what event data should be classified as potential risks. For example, the system may analyze images of a dog chewing on an arm of a couch and audio data of the user reprimanding the dog to determine that a dog chewing on the couch is a risk and the user should be alerted of the risk when immersed in the VR simulation. By using machine learning, the system may analyze the actions taken by the first user in response to the historical event data. Once the actions are analyzed, weights can be applied to the historical event data based on the actions taken by the first user. For example, a higher weight may be applied to event data (e.g., through image recognition analysis) of a child climbing on a bookshelf in a first user's home, while a lower weight may be applied to similar event data of a second user's home where the bookshelf is secured to the wall and historical event data of the second user does not show a user responding to the event data. In embodiments, the historical event data may be categorized into critical events and non-critical events based on the weights.

The process 400 continues by generating a risk tolerance threshold for the first user in response to the analyzed historical risk tolerance data. This is illustrated at step 415. One or more risk tolerance thresholds may be generated for various types of event data. For example, an adult user who typically answers the front door if the doorbell rings would prefer to be notified of the doorbell ringing. However, a child who typically does not answer the door would not want to be notified of the doorbell. Therefore, the specific risk tolerance threshold based on audio data of a doorbell ringing may be adjusted based on the user.

Figure 5:
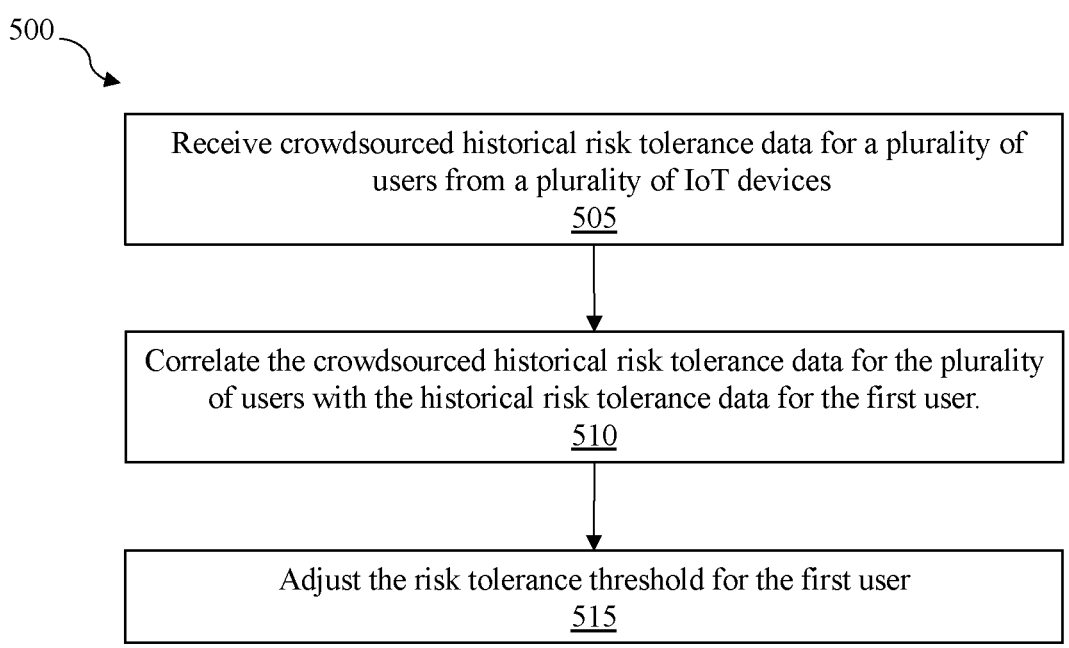
FIG. 5 illustrates a flow diagram of an example process for adjusting a risk tolerance threshold for a user based on crowdsourcing data, in accordance with embodiments of the present disclosure.

Referring now to FIG. 5, shown is a flow diagram of an example process 500 for adjusting a risk tolerance threshold for a user based on crowdsourcing data, in accordance with embodiments of the present disclosure. In embodiments, the process 500 may be in addition to or a subset of process 400 detailed in FIG. 4, respectively. The process 500 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 500 is a computer-implemented process. The process 500 may be performed by processor 104 exemplified in FIG. 1.

The process 500 begins by receiving crowdsourced risk tolerance data for a plurality of users from a plurality of IoT devices. This is illustrated at step 505. The crowdsourced data may be received from other linked IoT devices (e.g., IoT cameras, BLE sensors, VR devices, etc.) and or a database storing the crowdsourced risk tolerance data. The crowdsourced risk tolerance data is indicative of actions taken by the plurality of users in response to historical event data. For example, the crowdsourced risk tolerance data may include data indicating that a plurality of users consider a child moving within an active area of 5 square ft relative to the user is a potential risk.

The process 500 continues by correlating, using machine learning, the crowdsourced risk tolerance data for the plurality of users with the historical risk tolerance data for the first user. This is illustrated at step 510. For example, the crowdsourced risk tolerance data may indicate that the plurality of users consider a child moving within 5 ft to each user to be considered a risk necessitating an alert notification. However, historical risk tolerance data for a first user that does not have children may only include data showing the user considers a pet to be a risk within 5 ft of the user.

The process 500 continues by adjusting the risk tolerance threshold for the first user based off of the correlating. This is illustrated at step 515. The system may evaluate the crowdsourced data in conjunction with the first user's data and determine new weighting factors for determining risk. For example, the system may adjust the first user's risk tolerance threshold to include children as a potential risk. In this way, the system may use crowdsourcing data to adjust and/or generate new risk tolerance thresholds that may otherwise have not been generated for the first user based on the event data specific to the first user's environment.

Referring now to FIG. 6, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 300, 400, and 500).

System memory 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 6 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 1101. In some embodiments, however, individual components may have greater or lesser complexity than as represented in FIG. 6, components other than or in addition to those shown in FIG. 6 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    receiving, by a processor, event data from one or more devices communicatively coupled to a virtual reality (VR) device;
    comparing, by the processor, the event data to a risk tolerance threshold specifically generated for a first user;
    pushing, by the processor and in response to the risk tolerance threshold being met, a notification to the VR device indicating a potential risk to the first user has been detected;
    receiving, by the processor, crowdsourced risk tolerance data for a plurality of users from a plurality of VR devices, wherein the crowdsourced risk tolerance data is indicative of actions taken by the plurality of users in response to historical event data;
    correlating, by the processor and using machine learning, the crowdsourced risk tolerance data for the plurality of users with historical risk tolerance data for the first user; and
    adjusting, by the processor and based on the correlating, the risk tolerance threshold for the first user.

2. The method of claim 1, further comprising:
    receiving, by the processor, a set of historical risk tolerance data for the first user, wherein the set of historical risk tolerance data is indicative of actions taken by the first user in response to the historical event data;
    analyzing, by the processor and using machine learning, the set of historical risk tolerance data; and
    generating, by the processor and in response to the analyzing of the set of historical risk tolerance data, the risk tolerance threshold for the first user.

3. The method of claim 2, wherein analyzing the set of historical risk tolerance data comprises:
    identifying, by the processor, the actions taken by the first user in response to the historical event data; and
    applying, by the processor, weights to the historical event data based on the actions taken by the first user.

4. The method of claim 1, wherein the one or more devices include a camera disposed on the VR device.

5. The method of claim 1, wherein the one or more devices include an IoT device selected from the group consisting of a camera and a sensor.

6. The method of claim 1, wherein the event data comprises image data of an object relative to the first user.

7. The method of claim 1, wherein pushing the notification to the VR device is selected from the group consisting of:
    displaying a text message referring to the potential risk;
    displaying an image of the potential risk;
    displaying a live video feed of the potential risk; and
    providing an audio alert regarding the potential risk.

8. The method of claim 1, wherein the notification indicates to the first user that the potential risk has been detected within an action area relative to the first user.

9. The method of claim 8, wherein the action area is defined by a distance relative to the first user.

10. The method of claim 1, wherein the notification indicates to the first user that the potential risk has been detected outside of an action area relative to the first user.

11. A virtual reality system comprising:
    a processor; and
    a computer-readable storage medium communicatively coupled to the processor and storing program instructions which, when executed by the processor, cause the processor to perform a method comprising:
        receiving event data from one or more devices communicatively coupled to a virtual reality (VR) device;
        comparing the event data to a risk tolerance threshold specifically generated for a first user;
        pushing, in response to the risk tolerance threshold being met, a notification to the VR device indicating a potential risk to the first user has been determined;
        receiving crowdsourced risk tolerance data for a plurality of users from a plurality of VR devices, wherein the crowdsourced risk tolerance data is indicative of actions taken by the plurality of users in response to historical event data;
        correlating, using machine learning, the crowdsourced risk tolerance data for the plurality of users with historical risk tolerance data for the first user; and
        adjusting, based on the correlating, the risk tolerance threshold for the first user.

12. The virtual reality system of claim 11, wherein the method performed by the processor further comprises:
    receiving a set of historical risk tolerance data for the first user, wherein the set of historical risk tolerance data is indicative of actions taken by the first user in response to the historical event data;
    analyzing, using machine learning, the set of historical risk tolerance data for the first user; and
    generating, in response to the analyzing of the set of historical risk tolerance data, the risk tolerance threshold for the first user.

13. The virtual reality system of claim 12, wherein analyzing the set of historical risk tolerance data comprises:
    identifying the actions taken by the first user in response to the historical event data; and
    applying weights to the historical event data based on the actions taken by the first user.

14. The virtual reality system of claim 11, wherein the one or more devices include a camera disposed on the VR device.

15. A computer program product comprising a computer-readable storage medium having program instructions embodied therewith, wherein the computer-readable storage medium is not a transitory signal per se, the program instructions executable by a processor to cause the processor to perform a method comprising:
- receiving event data from one or more devices communicatively coupled to a virtual reality (VR) device;
- comparing the event data to a risk tolerance threshold specifically generated for a first user;
- pushing, in response to the risk tolerance threshold being met, a notification to the VR device indicating a potential risk to the first user has been determined;
- receiving crowdsourced risk tolerance data for a plurality of users from a plurality of VR devices, wherein the crowdsourced risk tolerance data is indicative of actions taken by the plurality of users in response to historical event data;
- correlating, using machine learning, the crowdsourced risk tolerance data for the plurality of users with historical risk tolerance data for the first user; and
- adjusting, based on the correlating, the risk tolerance threshold for the first user.

16. The computer program product of claim 15, wherein the method performed by the processor further comprises:
- receiving a set of historical risk tolerance data for the first user, wherein the set of historical risk tolerance data is indicative of actions taken by the first user in response to the historical event data;
- analyzing, using machine learning, the set of historical risk tolerance data for the first user; and
- generating, in response to the analyzing of the set of historical risk tolerance data, the risk tolerance threshold for the first user.

17. The computer program product of claim 16, wherein analyzing the set of historical risk tolerance data comprises:
- identifying the actions taken by the first user in response to the historical event data; and
- applying weights to the historical event data based on the actions taken by the first user.

\* \* \* \* \*